(12) United States Patent
Katsis et al.

(10) Patent No.: US 9,336,748 B1
(45) Date of Patent: May 10, 2016

(54) TILE ROW PIXEL SHIFT IN A TILED DISPLAY SYSTEM

(71) Applicant: PRYSM, Inc., San Jose, CA (US)

(72) Inventors: Dimitrios Katsis, Pleasant Hill, CA (US); Donald A. Krall, San Jose, CA (US)

(73) Assignee: PRYSM, Inc., San Jose, CA (US)

( * ) Notice: Subject to any disclaimer, the term of this patent is extended or adjusted under 35 U.S.C. 154(b) by 381 days.

(21) Appl. No.: 13/892,409

(22) Filed: May 13, 2013

Related U.S. Application Data

(60) Provisional application No. 61/646,729, filed on May 14, 2012.

(51) Int. Cl.
| | |
|---|---|
| *G02B 26/10* | (2006.01) |
| *H04N 9/31* | (2006.01) |
| *H04N 9/12* | (2006.01) |
| *G09G 5/10* | (2006.01) |
| *G06T 1/60* | (2006.01) |
| *G03B 21/00* | (2006.01) |

(52) U.S. Cl.
CPC *G09G 5/10* (2013.01); *G02B 26/10* (2013.01); *G02B 26/101* (2013.01); *G03B 21/00* (2013.01); *G06T 1/60* (2013.01); *H04N 9/12* (2013.01); *H04N 9/31* (2013.01)

(58) Field of Classification Search
None
See application file for complete search history.

(56) References Cited

U.S. PATENT DOCUMENTS

| | | | | |
|---|---|---|---|---|
| 6,128,131 | A * | 10/2000 | Tang | 359/443 |
| 6,256,131 | B1 * | 7/2001 | Wine et al. | 359/199.1 |
| 6,292,225 | B1 * | 9/2001 | Champion et al. | 348/511 |
| 6,774,868 | B1 * | 8/2004 | Bowen | 345/1.1 |
| 2001/0009419 | A1 * | 7/2001 | Ikeno et al. | 345/555 |
| 2007/0187616 | A1 * | 8/2007 | Burroughs et al. | 250/458.1 |

* cited by examiner

*Primary Examiner* — Joni Richer
(74) *Attorney, Agent, or Firm* — Patterson & Sheridan, LLP

(57) ABSTRACT

The display of a portion of an image in successive rows of display tiles in a tiled display system are delayed, so that the top portion of a first display tile is illuminated immediately after the bottom portion of a second display tile is illuminated, where the second display tile is adjacent to and above the first display tile. This removes the appearance of a broken up image when the image moves across the display tiles in a direction somewhat parallel to the direction of raster scanning. In this way, a raster scanning tiled display system does not produce a stair-step effect even though the top and bottom portion of an image on a tile in the tiled display system is raster-scanned at different times.

20 Claims, 4 Drawing Sheets

TILE ROW PIXEL SHIFT IN A TILED DISPLAY SYSTEM

CROSS-REFERENCE TO RELATED APPLICATIONS

This application claims benefit of U.S. Provisional Patent Application Ser. No. 61/646,729, filed May 14, 2012 which is herein incorporated by reference in its entirety.

BACKGROUND

1. Field

Implementations described herein relate generally to laser-based image-generating systems and, more specifically, to a method of tile row pixel shift in a tiled display system.

2. Description of the Related Art

Electronic display systems are commonly used to display information from computers and other sources. Typical display systems range in size from small displays used in mobile devices to very large displays, such as tiled displays, that are used to display images to thousands of viewers at one time. Tiled display systems are generally made up of multiple smaller individual display devices, or "tiles", that are carefully aligned when assembled to provide a seamless and uniform appearance. In some implementations, each tile may include a self-contained laser-based image-generating system.

In laser-based image-generating systems, a rotating polygon mirror is commonly used to scan one or multiple laser beams across an image-generating surface, such as the phosphor screen of a laser-phosphor display. A rotating polygon mirror is a multi-faceted optical element having a plurality of reflective surfaces. A laser beam incident on one of the reflective surfaces is directed to the image-generating surface, and as the polygon rotates, the incident laser beam sweeps across the image-generating surface, thereby producing one line of an image on the image-generating surface.

In some devices, a specialized rotating polygon mirror, known as a raster polygon mirror, is used to produce 2-dimensional scanning of lasers across the image-generating surface. In a raster polygon mirror, each reflective surface is canted at a different angle. As with a rotating polygon mirror, when the raster polygon mirror rotates, a laser beam incident on a reflective surface of the raster polygon beam sweeps across the image-generating surface to produce a line of an image on the image-generating surface. However, as each subsequent reflective surface rotates through the incident laser beam, the beam is directed to and sweeps across a different location on the image-generating surface, thereby performing 2-dimensional scanning of the laser across the image-generating surface. Thus, a raster polygon mirror allows a laser to be scanned across a 2-dimensional surface using a single moving component, thereby facilitating high-speed laser imaging technologies.

A drawback to using a raster polygon mirror for scanning lasers across an image-generating surface is that there is a substantial time delay between the scanning of the first portion of a 2-dimensional surface and the scanning of the final portion of the 2-dimensional surface. Consequently, when displaying a video of an object moving across the screen that is moving fast enough and is located on two or more tiles, a "Christmas tree" or "stair step" effect can be seen. One example of the Christmas tree effect is illustrated in FIG. 1.

FIG. 1 illustrates a portion of a tiled display system 100 that displays an elongated object 150 that is moving horizontally in direction 102 across three display tiles 121, 122, and 123. Each of display tiles 121, 122, and 123 displays an image by rastering lasers horizontally across the surface of the respective display tile using a rotating raster polygon mirror. Because of this, there is a discrete time delay between when a top portion and a bottom portion of elongated object 150 is produced on each of display tiles 121, 122, and 123. For example, the delay can be on the order of several milliseconds. When elongated object 150 is moving across tiled display system 100 at a high enough speed, elongated object 150 covers a distance 160 during such a time delay that is noticeable to a viewer of tiled display system 100. Thus, a segment 151 of elongated object 150 that is displayed by display tile 121, a top portion 151A and a bottom portion 151B of segment 151 appear to the viewer to be positioned as shown relative to each other, with bottom portion 151B trailing top portion 151A by distance 160. While elongated object 150 is not actually drawn diagonally, there is such an appearance because the viewer's eyes are moving while tracking the motion of elongated object 150. Similarly, a bottom portion 152B trails a top portion 152A of a segment 152 by distance 160 and a bottom portion 153B trails a top portion 153A of a segment 153 by distance 160. Consequently, the rendering of moving elongated object on tiled display system 100 appears to have a "stair step" because the image pixels on top portion 152A of segment 152 appears to lead the image pixels of bottom portion 151B of segment 151. A similar effect is in evidence between display tiles 122 and 123.

Depending upon the electronics and raster scan times, the above-described phenomenon may reveal itself in other display systems as well, especially when such display systems are large. Furthermore, such an effect may even be present in a liquid crystal display as the first pixel of a top row actually receives signal before the last pixel of the bottom row for imaging.

As the foregoing illustrates, there is a need in the art for a time-sequenced, segmented display system that can display moving objects without the Christmas tree or stair step effect.

SUMMARY

Implementations described herein set forth methods for delaying the display of a portion of an image in successive rows of display tiles in a tiled display system, so that the top portion of a first display tile is scanned by a light source immediately after the bottom portion of a second display tile is scanned by a light source, where the second display tile is adjacent to and above the first display tile. This removes the appearance of a broken up image when the image moves across the display tiles in a direction somewhat parallel to the direction of raster scanning. Thus, implementations described herein advantageously provide methods of operating a light-scanning tiled display system that does not produce a stair-step effect even though the image on each display tile is generated through raster scan.

In another implementation, a multi-tiled scanning system is provided. The multi-tiled scanning system comprises a plurality of tiles positioned to form a single display screen, comprising a first row of display tiles and a second row of display tiles, a light module, comprising a laser array for generating multiple scanning laser beams to simultaneously scan the display screen, a signal modulation controller that controls and modulates the scanning laser beams in the laser array to produce a desired image on the display screen, a relay optics module is disposed in the optical path of the scanning laser beams and is configured to shape the scanning laser beams to a desired spot shape and to direct the scanning laser beams into a closely spaced bundle of somewhat parallel beams, an imaging lens designed to direct each of the scanning laser beams onto pixel elements on the display screen, a polygon scanner comprising a rotating, multi-faceted optical element having a plurality of reflective surfaces for directing the scanning laser beams through the imaging lens to the display screen, wherein the rotation of the polygon scanner sweeps the scanning laser beams horizontally across the display screen and further defines the vertical positioning of the scanning laser beams on the display screen, and a mirror for directing the scanning laser beams from the relay optics module to the polygon scanner, where the orientation of the mirror partly determines the vertical positioning of the scanning laser beams on the display screen, and a central controller operable to provide output signals to each of the display tiles, wherein the output signals include a tile-to-tile delay such that the tiles of the second row receive portions of an image to be displayed after an appropriate, predetermined time delay relative to when the tiles of the first row receive portions of the image to be displayed.

BRIEF DESCRIPTION OF THE DRAWINGS

So that the manner in which the above recited features described herein can be understood in detail, a more particular description of the invention, briefly summarized above, may be had by reference to implementations, some of which are illustrated in the appended drawings. It is to be noted, however, that the appended drawings illustrate only typical implementations of this invention and are therefore not to be considered limiting of its scope, for the invention may admit to other equally effective implementations.

FIG. 5 illustrates a portion of a tiled display system that displays an elongated object that is moving horizontally across three display tiles.

For clarity, identical reference numbers have been used, where applicable, to designate identical elements that are common between figures. It is contemplated that features of one implementation may be incorporated in other implementations without further recitation.

DETAILED DESCRIPTION

Figure 1:
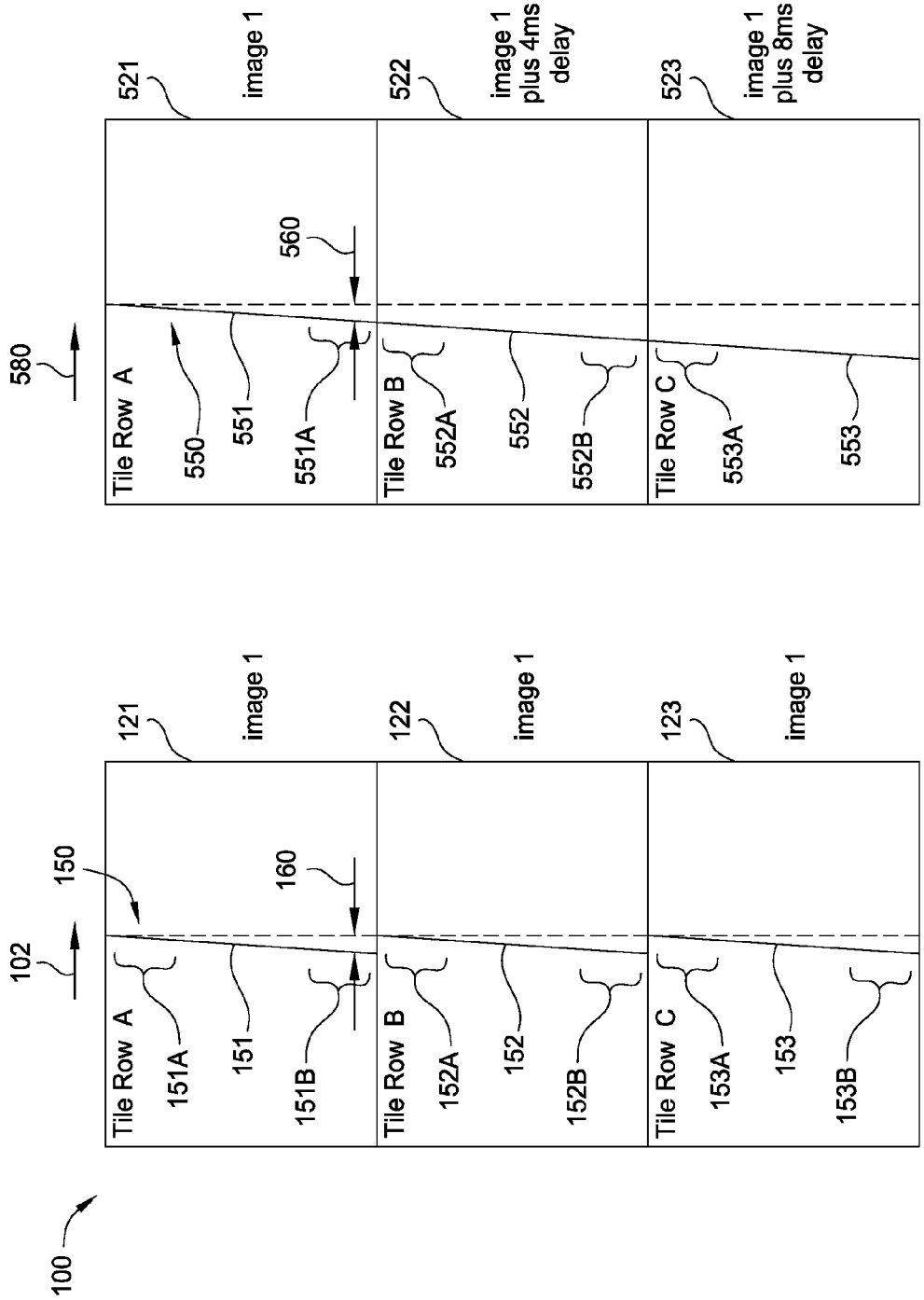
FIG. 1 illustrates a portion of a tiled display system that displays an elongated object that is moving horizontally in direction across three display tiles.
Figure 2:
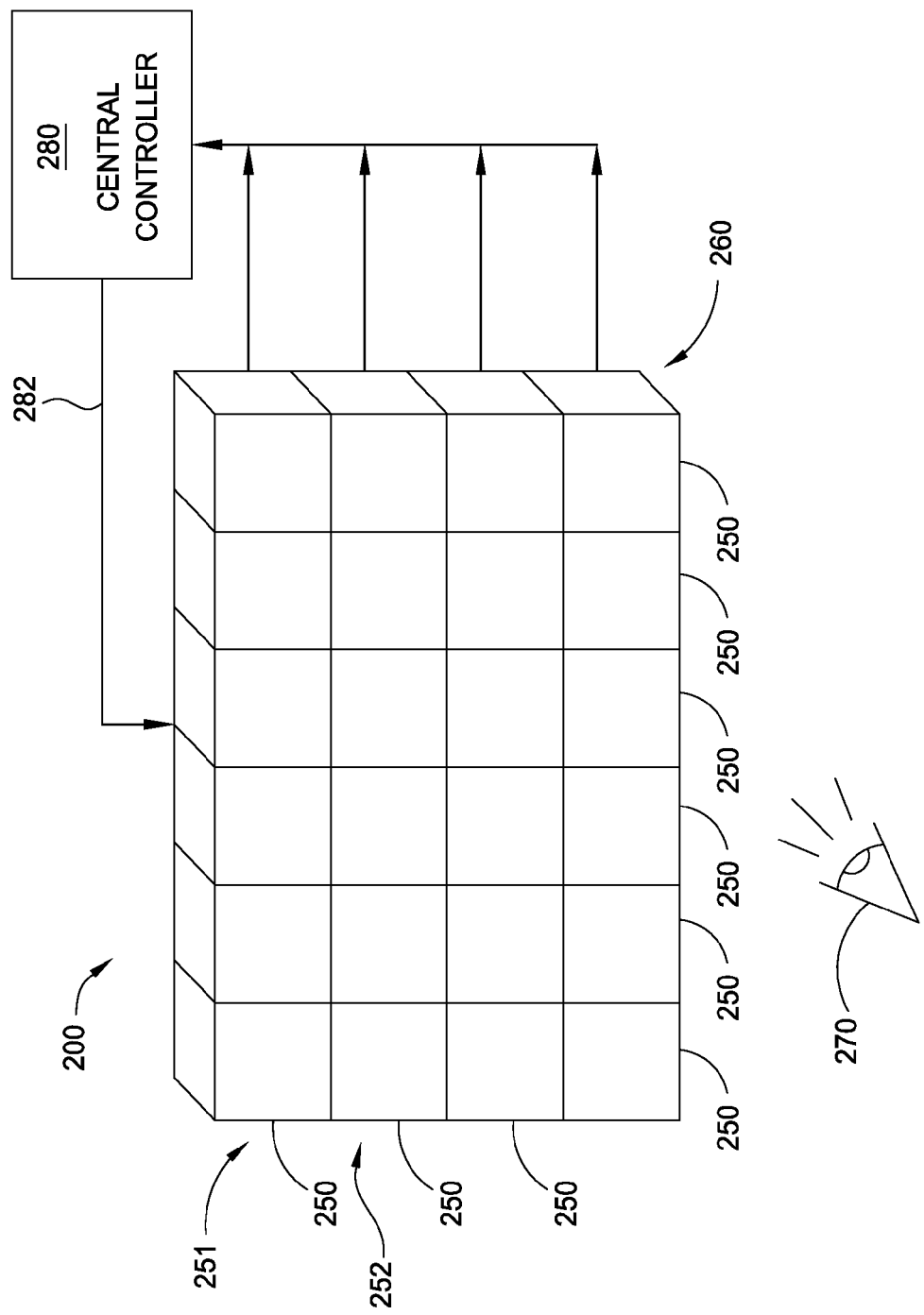
FIG. 2 is a schematic diagram of an imaging system configured according to implementations described herein.

FIG. 2 is a perspective schematic diagram of a tiled display system 200 that may benefit from implementations described herein. Tiled display system 200 comprises a plurality of tiles 250, which are positioned to form a single display screen 260 for a viewer 270. Each of tiles 250 is a light-based electronic display device, such as a laser-phosphor display (LPD), a light-emitting diode (LED) digital light processing (DLP), and the like, and is configured to produce a portion of an image for viewer 270 on display screen 260 by sequentially illuminating pixels on the display screen. In the implementation illustrated in FIG. 2, one or more lasers are rastered across the display screen included in the tile. In other implementations, non-laser light sources may be used, and multiple tiles may be associated with a single large screen. Tiled display system 200 includes a central controller 280 configured to provide output signals 282 to tiles 250. Output signals 282 may include the tile-to-tile delay that, according to implementations described herein, prevents the stair step effect for moving, multi-tile images. Specifically, the tiles 250 of second row 252 in display system 200 may receive portions of an image to be displayed after an appropriate, predetermined delay time relative to when the tiles 250 of first row 251 receive portions of the image to be displayed. In this way, the tiles 250 of second row 252 begin to produce the received image with a delay that causes a top portion of each tile 250 in second row 252 to be illuminated immediately after a bottom portion of first row 251 is illuminated. Alternatively, such a tile-tile delay may be programmed at the tile level for a particular configuration of tiled display system 200, in which case each tile in tiled display system 200 may receive image data substantially simultaneously with the other tiles 250 of tiled display system 200. Said image data is held in a frame buffer associated with each tile 250, and each tile 250 then displays a portion of an image after the programmed delay with respect to an adjacent row of tiles 250.

Figure 3:
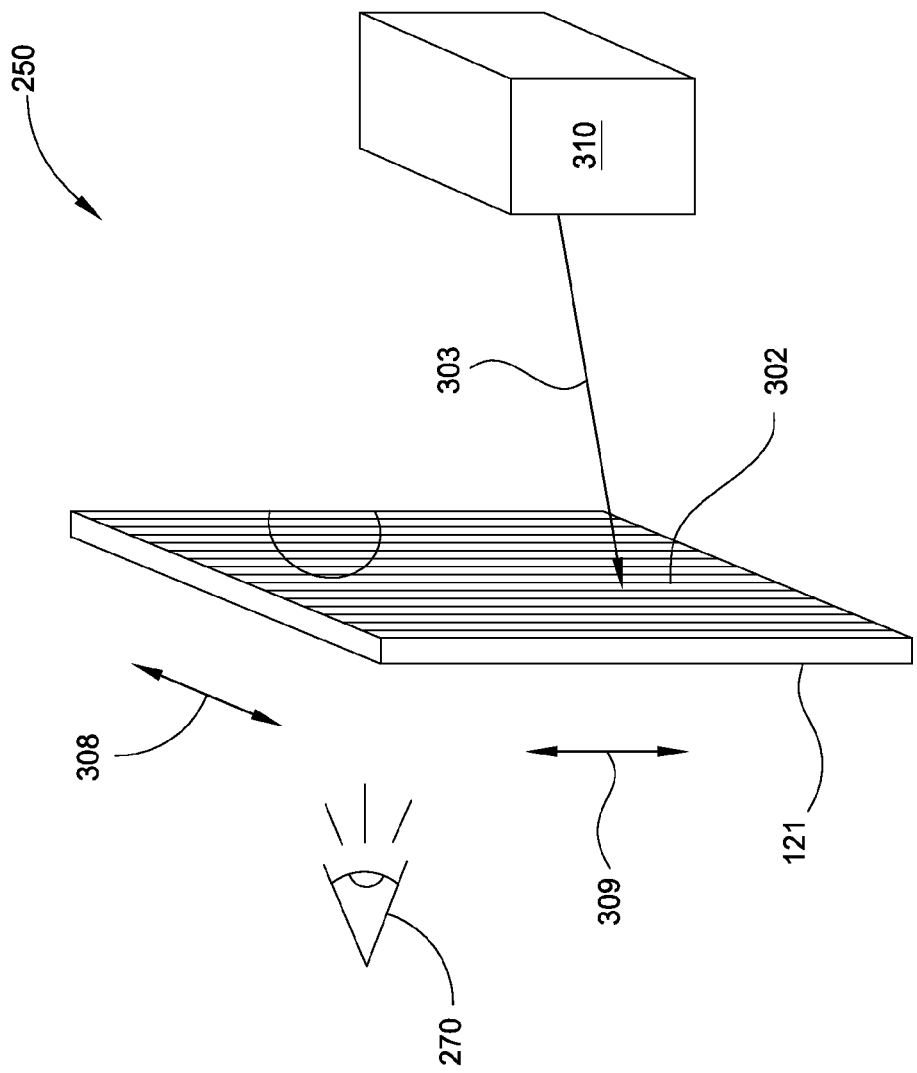
FIG. 3 is a schematic diagram of an exemplary configuration of one of the tiles in FIG. 2, according to one implementation described herein.

FIG. 3 is a schematic diagram of an exemplary configuration of one of tiles 250, according to one implementation described herein. As shown, tile 250 includes a light module 310 and a display screen 121, each of which is described below.

Display screen 121 includes phosphorescent stripes 302, and light module 310 is configured as a laser module that produces one or more scanning laser beams 303 to excite phosphorescent stripes 302. Phosphorescent stripes 302 are made up of alternating phosphorescent stripes of different colors, e.g., red, green, and blue, where the colors are selected so that they can be combined to form white light and other colors of light. Scanning laser beam 303 is a modulated light beam that is scanned across display screen 121 along two orthogonal directions, e.g., in the horizontal direction 308 and the vertical direction 309, in a raster scanning pattern to produce an image on display screen 121 for viewer 270.

It is noted that phosphorescent-containing materials are but one type of fluorescent material that may be disposed on display screen 121 that are suitable for forming color images. Various implementations described herein using phosphors as the fluorescent materials are also applicable to displays with screens including other optically excitable, light-emitting, and non-phosphor fluorescent materials. For example, quantum dot materials emit light under proper optical excitation and thus can be used as the fluorescent materials for systems and devices in this application, where semiconductor compounds such as CdSe and PbS, among others, can be fabricated in the form of particles with a diameter on the order of the exciton Bohr radius of the compounds as quantum dot materials to emit light. To produce light of different colors, different quantum dot materials with different energy band gap structures may be used to emit different colors under the same excitation light. Thus, in some implementations, phosphorescent stripes 302 may include a quantum dot material as a light-emitting material that absorbs optical energy from scanning laser beam 303, rather than a phosphor-containing material.

It is further noted that laser excitation of light-emitting or fluorescent materials on display screen 121 is but one of various forms of optical excitation technique that can impart energy sufficient to cause the fluorescent materials to emit light or to luminesce. In other implementations, such optical excitation may be generated by a non-laser light source that is sufficiently energetic to excite the fluorescent materials disposed on display screen 121. Examples of non-laser excitation light sources include various light-emitting diodes (LEDs), light lamps and other light sources that produce light at a wavelength or a spectral band to excite a fluorescent material that converts the light of a higher energy into light of lower energy and in the visible range.

Figure 4:
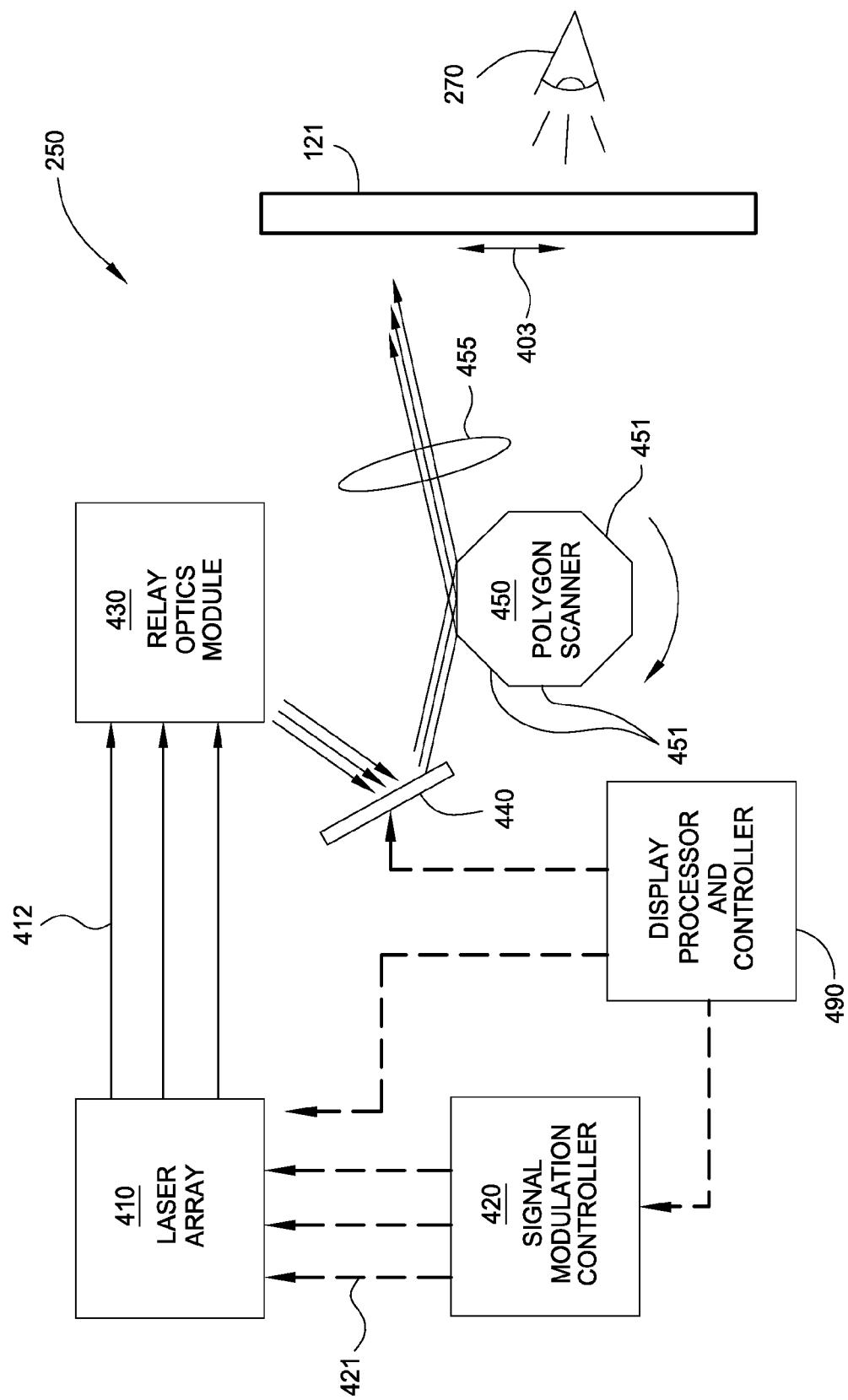
FIG. 4 is a schematic diagram of a light module and a display screen configured according to an exemplary implementation described herein.

FIG. 4 is a schematic diagram of light module 310 and display screen 121 configured according to an exemplary implementation described herein. Light module 310 includes a signal modulation controller 420, a laser array 410, a relay optics module 430, a mirror 440, a polygon scanner 450, an imaging lens 455, and a display processor and controller 490, configured as shown.

Laser array 410 includes multiple lasers, e.g., 5, 10, 20, or more, and generates multiple laser beams 412 to simultaneously scan display screen 121. In one implementation, the lasers in laser array 410 are ultraviolet (UV) lasers producing light with a wavelength between about 400 nm and 450 nm. Laser beams 412 are modulated light beams that are scanned across display screen 121 along two orthogonal directions, e.g., horizontally and vertically, in a raster scanning pattern to produce an image on display screen 121 for viewer 270.

Signal modulation controller 420 controls and modulates the lasers in laser array 410 so that laser beams 412 are modulated at the appropriate output intensity to produce a desired image on display screen 121. Signal modulation controller 420 may include a digital image processor that generates laser modulation signals 421. Laser modulation signals 421 include the three different color channels and are applied to modulate the lasers in laser array 410.

Together, relay optics module 430, mirror 440, polygon scanner 450, and imaging lens 455 direct laser beams 412 to display screen 121 and scan laser beams 412 horizontally and vertically across display screen 121 in a raster-scanning pattern to produce an image. For the sake of description, "horizontal" with respect to display screen 121 in FIG. 4 is defined as parallel to arrow 403 and "vertical" with respect to display screen 121 is defined as perpendicular to the plane of the page. Relay optics module 430 is disposed in the optical path of laser beams 412 and is configured to shape laser beams 412 to a desired spot shape and to direct laser beams 412 into a closely spaced bundle of somewhat parallel beams. Mirror 440 is a reflecting optic that can be quickly and precisely rotated to a desired orientation, such as a galvanometer mirror, a microelectromechanical system (MEMS) mirror, etc. Mirror 440 directs laser beams 412 from relay optics module 430 to polygon scanner 450, where the orientation of mirror 440 partly determines the vertical positioning of laser beams 412 on display screen 121. Polygon scanner 450 is a rotating, multi-faceted optical element having a plurality of reflective surfaces 451, e.g., 5 to 10, and directs laser beams 412 through imaging lens 455 to display screen 121. The rotation of polygon scanner 450 sweeps laser beams 412 horizontally across the surface of display screen 121 and further defines the vertical positioning of laser beams 412 on display screen 121. Imaging lens 455 is designed to direct each of laser beams 412 onto the closely spaced pixel elements 205 on display screen 121.

Display processor and controller 490 includes one or more processing units and memory units, including a frame buffer for storing digital image information, i.e., output signals 282 in FIG. 2, received from central controller 280.

In operation, the positioning of mirror 440 and the rotation of polygon scanner 450 horizontally and vertically scan laser beams 412 across display screen 121 so that all of pixel elements on display screen are illuminated as desired. To with, as polygon scanner 450 rotates one of reflective surfaces 451 through incident laser beams 412, each of laser beams 412 is directed to sweep horizontally across display screen 121 from one side to the other, each laser beam following a different vertically displaced laser scanning path 302, thereby illuminating the pixel elements disposed in a laser scanning path. Given N lasers in laser array 410 and N laser beams 412, a "swath" consisting of N laser scanning paths is illuminated as polygon scanner 450 rotates one of reflective surfaces 451 through incident laser beams 412. Because each of reflective surfaces 451 is canted at a different angle with respect to the horizontal, i.e., the plane of the page, when polygon scanner 450 rotates a subsequent reflective surface 451 through incident laser beams 412, the beams sweep horizontally across display screen 121 at a different vertical location. Thus, given N laser beams and M reflective surfaces 451 of polygon scanner 450, one rotation of polygon scanner 450 "paints" M×N rows of pixels. If display screen 121 is made up of more than M×N horizontal rows of pixels, then mirror 440 can be repositioned so that another field of M×N horizontal rows of pixels will be painted during the next rotation of polygon scanner 450. In some configurations of tile 250, the rows of such fields are interlaced on display screen 121. Once all pixels of display screen 121 have been illuminated, mirror 440 returns to an initial or top position and the cycle is repeated in synchronization with the refresh rate of the display.

As noted above, the time delay that occurs between a first reflective surface 451 and a last reflective surface 451 of polygon scanner 450 produces the Christmas tree effect in moving elongated objects. According to some implementations described herein, a programmable delay is implemented via a frame buffer associated with each tile 250 so that each tile 250 can delay generation of an image by a programmable number of frames, or a programmable number of fields for interlaced systems. The delay is selected so that the top rows of pixels of a tile 250 are illuminated by laser beams 412 immediately after the bottom rows of pixels of an adjacent tile 250 are illuminated, where the adjacent tile 250 is located directly above the tile 250 that experiences the delay. To enable such a delay, a frame buffer included in display processor and controller 490 is configured to store a sufficient number of frames for tile 250, where the number of frames is a function of the frame rate of the image being produced and the duration of the above-described delay.

Generally all tiles 250 in a particular row of tiles will be programmed with the same delay. For example, in a configuration of tile 250 in which the delay between laser beams 412 scanning across a topmost portion of display screen 121 and a bottommost portion of display screen 121 is 10 milliseconds, the delay in scanning the topmost portion of the next lower row of tiles 250 is also 10 milliseconds, and this delay is applied to all tiles 250 in a given row. In operation, tiled display system 200 generates an image of an elongated, moving object that does not have the Christmas tree effect, since from tile to tile there is no discontinuity of the elongated object. An example thereof is illustrated in FIG. 5.

FIG. 5 illustrates a portion of tiled display system 200 that displays an elongated object 550 that is moving horizontally in direction 580 across three display tiles 521, 522, and 523. Together, display tiles 521, 522, and 523 display elongated object 550. When elongated object 550 is moving across tiled display system 500 at a high enough speed, the time delay between a top portion of each tile and the bottom portion of each tile being scanned by multiple laser beams 412 is long enough for elongated object 550 to cover a distance 560, which is noticeable to a viewer of tiled display system 200. However, because display tile 522 delays scanning a top portion 552A of a segment 552 of elongated object 150, the Christmas tree effect is avoided. Specifically, display tile 522 delays scanning top portion 552A of segment 552 until a bottom portion 551A of segment 551 has been scanned by display tile 521. Similarly, display tile 523 delays scanning top portion 553A of segment 553 until a bottom portion 552B of segment 552 has been scanned by display tile 522. In this way, visible discontinuities are not present in the image of elongated object 550.

It is noted that the delay between display tile 521 (and the other tiles in tile row A) and display tile 523 (and the other tiles in tile row C) is cumulative. Thus, in an implementation in which the tile-to-tile delay between display tile 521 and 522 is 10 milliseconds, the delay between display tile 521 and 523 is 20 milliseconds. While such cumulative delay can significantly distort the overall position of elongated object 550 when tiled display system 200 includes a large number of rows of tiles, such distortion is generally difficult to perceive, because the human eye has difficulty in distinguishing such distortions if it has to compare two locations by moving the eye.

In another implementation, the desired tile-to-tile delay for avoiding the Christmas tree effect is achieved by offsetting the polygon scanners 450 of the tiles in a particular row of tiles 250 with respect to the adjacent, higher row of tiles 250. The polygon scanners 450 in one tile row can be offset by controlling said polygon scanners 450 to rotate with the appropriate delay with respect to the adjacent, higher row of tiles 250. Thus, the polygon scanners 450 of a particular tile row in tiled display system 200 are out of phase with the polygon scanners 450 of adjacent rows. In such an implementation, the delay is selected as described above, for example by the equivalent of one or two image frames, as desired.

In some implementations, the much smaller Christmas tree effect that occurs between each swath within a tile 250 can be compensated for in an analogous manner. Namely, a small delay can be introduced electronically between each swath. In some implementations, the electronically introduced delay may be determined for specific objects moving across a tiled display system rather than for a complete swath. In such an implementation, a motion estimation optimization algorithm may be used to determine motion vectors of objects moving in a video, and the magnitude and direction of said motion vectors determines the electronic delay applied to the pixels of the moving object.

While the foregoing is directed to implementations of the present invention, other and further implementations of the invention may be devised without departing from the basic scope thereof, and the scope thereof is determined by the claims that follow.

We claim:

1. A method of producing an image on a multi-tiled scanning system, the method comprising:
   in a first display tile, scanning a light source in a scanning direction across a first portion of the first display tile disposed at a first edge of the first display tile to produce a first portion of the image in the first display tile;
   after scanning the first portion, scanning a light source across a second portion of the first display tile that is disposed at a second edge of the first display tile to produce a second portion of the image in the first display tile, wherein the second edge is positioned opposite the first edge; and
   after scanning the first portion, begin a scan in second display tile by scanning a light source across a portion of the second display tile disposed at a first edge of the second display tile to produce a portion of the image in the second display tile, where the second display tile is at a location perpendicular to the scanning direction,
   wherein the first edge of the second display tile is adjacent to the second edge of the first display tile, and
   wherein scanning the light source across the portion of the second display tile begins immediately after a selected time delay with respect to scanning the first portion, the selected time delay being substantially equal to the duration of time between beginning scanning the first portion of the first display tile and completing scanning the second portion of the first display tile.

2. The method of claim 1, wherein the selected time delay is a programmable delay implemented via a frame buffer associated with each of the first display tile and the second display tile.

3. The method of claim 1, wherein the bottom portion of the first tile comprises a bottom row of pixels and the portion of the second tile comprises a top row of pixels.

4. The method of claim 3, wherein the top row of pixels of the second tile are illuminated by the scanning light source immediately after the bottom row of pixels of the first tile are illuminated.

5. The method of claim 4, wherein the first tile is positioned directly above the second tile.

6. The method of claim 1, wherein the first display tile is part of a first row of display tiles and each display tile in the first row of tiles is programmed with the same selected time delay.

7. The method of claim 6, wherein the second display tile is part of a second row of display tiles and each display tile in the second row of tiles is programmed with a second selected time delay.

8. The method of claim 1, in a third display tile, scanning a light source across a portion of the third display tile disposed at a second edge of the second display tile to produce a portion of the image in the third display tile,
   wherein an edge of the third display tile is adjacent to the second edge of the second display tile, and
   wherein scanning the light source across a portion of the third display tile begins after a selected time delay with respect to scanning the second portion of the second display tile, the selected time delay being substantially equal to the duration of time between scanning the first portion of the second display tile and completing scanning the second portion of the second display tile.

9. The method of claim 1, wherein each display tile includes a corresponding polygon scanner and the polygon scanner associated with the first display tile is offset relative to the polygon scanner associated with the second display tile.

10. A method of producing an image on a multi-tiled scanning system, the method comprising:
    in a first display tile, scanning a light source across a first portion of the first display tile disposed at a first edge of the first display tile to produce a first portion of the image in the first display tile;
    after scanning the first portion, scanning a light source across a second portion of the first display tile that is disposed at a second edge of the first display tile to produce a second portion of the image in the first display tile, wherein the second edge is positioned opposite the first edge; and
    after scanning the first portion, in a second display tile, scanning a light source across a portion of the second display tile disposed at a first edge of the second display tile to produce a portion of the image in the second display tile, wherein the first edge of the second display tile is adjacent to the second edge of the first display tile, wherein scanning the light source across the portion of the second display tile begins after a selected time delay with respect to scanning the first portion, the selected time delay being substantially equal to the duration of time between beginning scanning the first portion of the first display tile and completing scanning the second portion of the first display tile, wherein the selected time delay is a programmable delay implemented via a frame buffer associated with each of the first display tile and the second display tile, and wherein the frame buffer delays generation of the image by a programmable number of frames.

11. A method of producing an image on a multi-tiled scanning system, the method comprising:

in a first display tile, scanning a light source across a first portion of the first display tile disposed at a first edge of the first display tile to produce a first portion of the image in the first display tile;

after scanning the first portion, scanning a light source across a second portion of the first display tile that is disposed at a second edge of the first display tile to produce a second portion of the image in the first display tile, wherein the second edge is positioned opposite the first edge; and after scanning the first portion, in a second display tile, scanning a light source across a portion of the second display tile disposed at a first edge of the second display tile to produce a portion of the image in the second display tile, wherein the first edge of the second display tile is adjacent to the second edge of the first display tile, wherein scanning the light source across the portion of the second display tile begins after a selected time delay with respect to scanning the first portion, the selected time delay being substantially equal to the duration of time between beginning scanning the first portion of the first display tile and completing scanning the second portion of the first display tile, wherein the selected time delay is a programmable delay implemented via a frame buffer associated with each of the first display tile and the second display tile, and wherein the frame buffer stores a number of frames for each corresponding tile and the number of frames is a function of a frame rate of the image being produced and the duration of the selected time delay.

12. A multi-tiled scanning system, comprising:
a plurality of tiles positioned to form a single display screen, comprising:
a first row of display tiles; and
a second row of display tiles;
a light module, comprising:
a laser array for generating multiple scanning laser beams to simultaneously scan the display screen;
a signal modulation controller that controls and modulates the scanning laser beams in the laser array to produce a desired image on the display screen;
a relay optics module is disposed in the optical path of the scanning laser beams and is configured to shape the scanning laser beams to a desired spot shape and to direct the scanning laser beams into a closely spaced bundle of somewhat parallel beams;
an imaging lens designed to direct each of the scanning laser beams onto pixel elements on the display screen;
a polygon scanner comprising a rotating, multi-faceted optical element having a plurality of reflective surfaces for directing the scanning laser beams through the imaging lens to the display screen, wherein the rotation of the polygon scanner sweeps the scanning laser beams horizontally across the display screen and further defines the vertical positioning of the scanning laser beams on the display screen;
a mirror for directing the scanning laser beams from the relay optics module to the polygon scanner, where the orientation of the mirror partly determines the vertical positioning of the scanning laser beams on the display screen; and
a central controller operable to:
provide output signals to each of the display tiles, wherein the output signals include a tile-to-tile delay such that the tiles of the second row receive portions of an image to be displayed immediately after an appropriate, predetermined time delay substantially equal to the duration of time between beginning scanning a first portion of a first display tile and completing scanning a second portion of a first display tile.

13. The system of claim 12, wherein the display tiles of the second row begin to produce the received portions of the image with a delay that causes a top portion of each tile in the second row to be illuminated immediately after a bottom portion of each tile in the first row is illuminated.

14. The system of claim 12, further comprising: a frame buffer associated with each display tile, wherein each display tile in the multi-tiled scanning system receives image data substantially simultaneously with the other display tiles of the scanning system and the image data is stored in the frame buffer and each display tile then displays a portion of the image after the delay with respect to an adjacent row tiles.

15. The system of claim 12, wherein each of the display tiles is a light-based display selected from the group of: a laser-phosphor display (LPD), a light-emitting diode (LED), and digital light processing (DLP).

16. The system of claim 12, wherein each display screen includes phosphorescent stripes of alternating phosphorescent stripes of different colors.

17. The system of claim 16, wherein the scanning laser beams excite the phosphorescent stripes.

18. The system of claim 12, wherein the scanning laser beams are modulated light beams that are scanned across the display screen along two orthogonal directions in a raster scanning pattern to produce the image anon the display screen.

19. The system of claim 12, wherein each display tile in the first row of tiles is programmed with the same tile to tile delay.

20. A multi-tiled scanning system, comprising:
a plurality of tiles positioned to form a single display screen, comprising:
a first row of display tiles; and
a second row of display tiles;
a light module, comprising:
a laser array for generating multiple scanning laser beams to simultaneously scan the display screen;
a signal modulation controller that controls and modulates the scanning laser beams in the laser array to produce a desired image on the display screen;
a relay optics module is disposed in the optical path of the scanning laser beams and is configured to shape the scanning laser beams to a desired spot shape and to direct the scanning laser beams into a closely spaced bundle of somewhat parallel beams;
an imaging lens designed to direct each of the scanning laser beams onto pixel elements on the display screen;
a polygon scanner comprising a rotating, multi-faceted optical element having a plurality of reflective surfaces for directing the scanning laser beams through the imaging lens to the display screen, wherein the rotation of the polygon scanner sweeps the scanning laser beams horizontally across the display screen and further defines the vertical positioning of the scanning laser beams on the display screen;
a mirror for directing the scanning laser beams from the relay optics module to the polygon scanner, where the orientation of the mirror partly determines the vertical positioning of the scanning laser beams on the display screen;
a central controller operable to:
provide output signals to each of the display tiles, wherein the output signals include a tile-to-tile delay such that the tiles of the second row receive portions of an image to be displayed after an appropriate, predetermined time delay relative to when the tiles of the first row receive portions of the image to be displayed; and
a frame buffer associated with each display tile, wherein each display tile in the multi-tiled scanning system receives image data substantially simultaneously with the other display tiles of the scanning system and the image data is stored in the frame buffer and each display tile then displays a portion of the image after the delay with respect to an adjacent row tiles, and wherein the frame buffer delays generation of the image by a programmable number of frames.

* * * * *